(12) United States Patent
Price et al.

(10) Patent No.: US 10,431,098 B1
(45) Date of Patent: Oct. 1, 2019

(54) VEHICLE LOCATION SYSTEM

(71) Applicant: Capital One Services, LLC, McLean, VA (US)

(72) Inventors: Micah Price, Plano, TX (US); Geoffrey Dagley, McKinney, TX (US); Jason Richard Hoover, Grapevine, TX (US); Stephen Michael Wylie, Carrollton, TX (US); Qiaochu Tang, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/289,928

(22) Filed: Mar. 1, 2019

(51) Int. Cl.
*G08G 1/00* (2006.01)
*G06F 16/9535* (2019.01)

(52) U.S. Cl.
CPC ......... *G08G 1/205* (2013.01); *G06F 16/9535* (2019.01)

(58) Field of Classification Search
CPC combination set(s) only.
See application file for complete search history.

(56) References Cited

U.S. PATENT DOCUMENTS

| | | | | |
|---|---|---|---|---|
| 2012/0007749 | A1* | 1/2012 | Oldknow | G08G 1/017 340/933 |
| 2014/0195283 | A1* | 7/2014 | Stefik | G06Q 10/02 705/5 |
| 2016/0063863 | A1* | 3/2016 | Stefik | G06Q 10/02 340/932.2 |
| 2017/0249626 | A1* | 8/2017 | Marlatt | G01V 3/081 |

* cited by examiner

*Primary Examiner* — Travis R Hunnings
(74) *Attorney, Agent, or Firm* — DLA Piper LLP (US)

(57) ABSTRACT

A computer system receives a request to locate a vehicle within a facility. The computer system parses the request to identify one or more characteristics of the vehicle. The computer system identifies a sensor corresponding to the vehicle based on the one or more characteristics of the vehicle. The computer system identifies a most recent location of the vehicle based on the last registered position of the vehicle within the facility. The computer system transmits a signal to a parking spot sensor at the most recent location of the vehicle in the facility. The computer system receives the unique identification. The computer system determines that the unique identification of the vehicle sensor co-located with the parking spot sensor matches the sensor of the requested vehicle. The computer system reports to the user a current location of the vehicle within the facility based on a location of the parking spot sensor.

20 Claims, 6 Drawing Sheets

VEHICLE LOCATION SYSTEM

FIELD OF THE DISCLOSURE

The present disclosure generally relates to a vehicle location system and a method of operating the same.

BACKGROUND

For organizations, it is typically difficult to manage the location of vehicles maintained therein. Conventional systems rely on global positioning systems (GPS), which are able to provide accurately location information on a large scale, but are limited in locating items on a more granular scale. For example, current vehicle location systems that rely on GPS to identify a location of a vehicle in a car dealership lot, frequently encounter inaccurate location information due to the level of granularity needed to identify the exact location of a vehicle contained therein.

SUMMARY

Embodiments disclosed herein generally relate to a vehicle location system, and a method of operating the same. In one embodiment, a method of locating a vehicle is disclosed herein. A computer system receives a request, from a user, to locate a vehicle within a facility associated with an organization. The computer system parses the request to identify one or more characteristics of the vehicle. The computer system identifies a sensor corresponding to the vehicle based on the one or more characteristics of the vehicle. The computer system identifies a most recent location of the vehicle based on the last registered position of the vehicle within the facility. The computer system transmits a signal to a parking spot sensor at the most recent location of the vehicle in the facility. The signal is an instruction to the parking spot sensor to report back a unique identification of a vehicle sensor co-located therewith. The computer system receives, from the parking spot sensor, the unique identification of the vehicle sensor co-located therewith. The computer system determines that the unique identification of the vehicle sensor co-located with the parking spot sensor matches the sensor of the requested vehicle. The computer system reports to the user a current location of the vehicle within the facility based on a location of the parking spot sensor.

In some embodiments, the one or more characteristics of the vehicle include a license plate number, a vehicle make, a vehicle model, a vehicle color, and a vehicle mileage.

In some embodiments, receiving, from the parking spot sensor, the unique identification of the vehicle sensor co-located therewith includes receiving, from the parking spot sensor, a return signal and identifying a strength of the return signal to confirm the vehicle from which it originated.

In some embodiments, the sensor further includes a shield configured to at least partially block signals emitted from adjacent vehicles.

In some embodiments, receiving, from the parking spot sensor, the unique identification of the vehicle sensor co-located therewith includes receiving the unique identification from a hub co-located with the vehicle sensor, the hub configured as a relay between the vehicle sensor and the organization.

In some embodiments, identifying a most recent location of the vehicle based on the last registered position of the vehicle within the facility includes the computing system identifying a location history of the vehicle and identifying a parking spot sensor at the most recent location of the vehicle in the facility.

In some embodiments, the instruction to the parking spot sensor to report back the unique identification of a vehicle sensor co-located therewith includes an instruction to ping the vehicle sensor co-located therewith.

In another embodiment, a system is disclosed herein. The system includes one or more sensors and a computing system. Each sensor of the one or more sensors is positioned within a bounded location within a facility. The computing system is in communication with the one or more sensors. The computing system includes a processor and a memory. The memory has programming instructions stored thereon, which, when executed by the processor, performs an operation of locating a vehicle. The operation includes receiving a request, from a user, to locate a vehicle within a facility associated with an organization. The operation further includes parsing the request to identify one or more characteristics of the vehicle. The operation further includes identifying a vehicle sensor corresponding to the vehicle based on the one or more characteristics of the vehicle. The operation further includes identifying a most recent location of the vehicle based on the last registered position of the vehicle within the facility. The operation further includes transmitting a signal to a sensor of the one or more sensors positioned at the most recent location of the vehicle in the facility. The signal is an instruction to the sensor to report back a unique identification of a vehicle sensor co-located therewith. The operation further includes receiving, from the parking spot sensor, the unique identification of the vehicle sensor co-located therewith. The operation further includes determining that the unique identification of the vehicle sensor co-located with the sensor matches the vehicle sensor of the requested vehicle. The operation further includes reporting to the user a current location of the vehicle within the facility based on a location of the sensor.

In some embodiments, the one or more characteristics of the vehicle include a license plate number, a vehicle make, a vehicle model, a vehicle color, and a vehicle mileage.

In some embodiments, receiving, from the parking spot sensor, the unique identification of the vehicle sensor co-located therewith includes receiving, from the parking spot sensor, a return signal and identifying a strength of the return signal to confirm the vehicle from which it originated.

In some embodiments, the sensor further includes a shield configured to at least partially block signals emitted from adjacent vehicles.

In some embodiments, receiving, from the parking spot sensor, the unique identification of the vehicle sensor co-located therewith includes receiving the unique identification from a hub co-located with the vehicle sensor, the hub configured as a relay between the vehicle sensor and the organization.

In some embodiments, identifying a most recent location of the vehicle based on the last registered position of the vehicle within the facility includes identifying a location history of the vehicle and identifying a sensor at the most recent location of the vehicle in the facility.

In some embodiments, the instruction to the sensor to report back the unique identification of the vehicle sensor co-located therewith includes an instruction to ping the vehicle sensor co-located therewith.

In another embodiment, a method of customizing a user experience is disclosed herein. A computer system receives, from a remote sensor, a signal. The single includes an indication of a user's arrival at a facility. The indication is trigged by the remote sensor receiving an emitted signal from a vehicle sensor positioned in a vehicle of the user. The computer system parses the signal to identify a user identifier contained therein. The computer system queries a database with the user identifier to locate a profile associated with the user. The computer system identifies, in the profile, one or more preferences of the user based on a user history at the facility. The computer system customizes the user experience based on the one or more preferences of the user.

In some embodiments, the facility is a restaurant.

In some embodiments, identifying, in the profile, one or more preferences of the user based on the user history at the facility includes the computer system identifying a most frequently ordered meal of the user at the facility.

In some embodiments, the remote sensor is positioned at an entrance of the facility.

In some embodiments, parsing, by the computer system, the signal to identify a user to identify the user identifier contained therein includes demodulating the signal received from the remote sensor.

In some embodiments, the computer system further receives, from a second remote sensor, a second signal. The second signal includes a second indication of the user's arrival at a second facility. The second indication is trigged by the second remote sensor receiving a second emitted signal from the vehicle sensor positioned in the vehicle of the user. The computer system parses, by the computer system, the second signal to identify the user identifier contained therein. The computer system queries the database with the user identifier to locate the profile associated with the user. The computer system identifies, in the profile, a subset of the one or more preferences of the user based on a second user history at the second facility. The computer system customizes the user experience based on the subset of the one or more preferences of the user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein generally relate to an improved vehicle location system. For example, one or more techniques described herein leverage sensors positioned in both a facility, as well as a vehicle, to accurately identify a location of a vehicle. In operation, the sensor placed in the vehicle ("vehicle sensor") may continually emit a signal to be received by the one or more sensors positioned within the facility ("facility sensor"). The emitted signal may be modulated to include a unique identification code that corresponds to the vehicle. When a facility sensor receives the modulated signal, the facility sensor may demodulate the signal, identify the unique identification code contained therein, and forward the information to an organization computing system.

Such vehicle location system provides various improvements over conventional systems. For example, by locating facility sensors through a given facility, an end user has the ability to locate a vehicle at a parking space granularity. As such, in embodiments in which a customer arrives at a facility and seeks a particular vehicle, the end user may easily identify the exact location of the vehicle in the facility. In another example, the vehicle location system may enable organizations to customize a user's experience. Facility sensors may be placed at an entrance to detect the arrival of a customer's vehicle. In situations in which the facility is a fast food restaurant (for example), the facility may identify a frequently ordered item associated with the user and begin preparation of that item.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
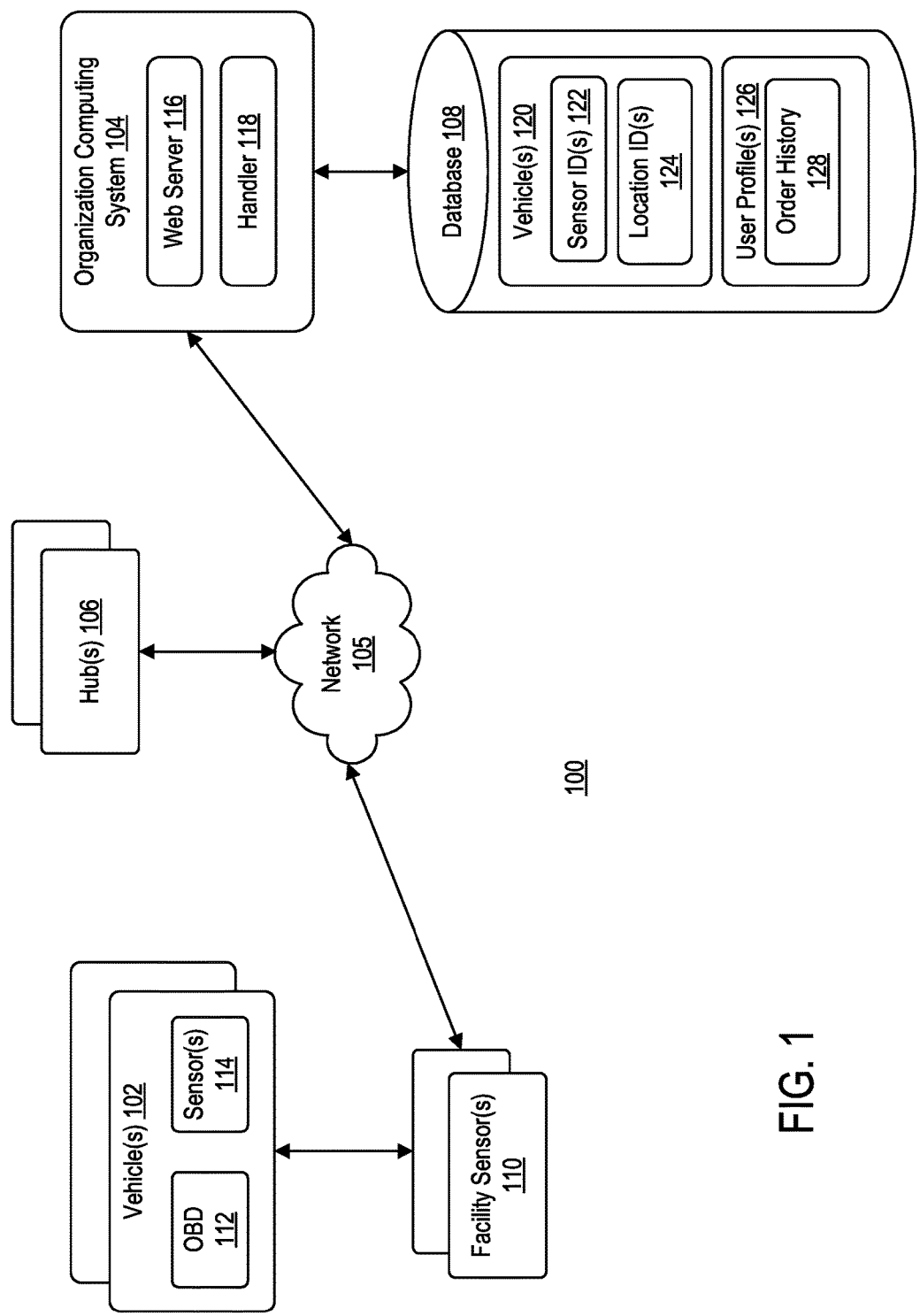
FIG. 1 is a block diagram illustrating a computing environment, according to one exemplary embodiment.

FIG. 1 is a block diagram illustrating a computing environment 100, according to one embodiment. Computing environment 100 may include at least one or more vehicles 102, one or more parking spot sensors 110 and organization computing system 104 communicating via network 105. In some embodiments, computing environment 100 may further include one or more hubs 106. Hubs 106 may be logically positioned between parking spot sensors 110 and organization computing system 104.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of system 100.

Each vehicle 102 may include at least an on-board diagnostic (OBD) apparatus 112 and one or more sensors 114. OBD apparatus 112 may be a diagnostic connector coupled with vehicle 102, such that OBD apparatus 112 may be able to diagnose issues with vehicle 102. In some embodiments, OBD apparatus 112 may be configured to report such issues to a third party system via network 105. One or more sensors 114 may be selectively positioned within vehicle 102. In some embodiments, each vehicle 102 may have a single vehicle sensor 114. For example, in these embodiments, vehicle sensor 114 may be positioned near a front of the vehicle, near the rear of the vehicle, centrally located in the vehicle, or the like. In some embodiments, each vehicle 102 may include two or more sensors 114. For example, sensors 114 may be positioned at a front and rear of a vehicle, at a front and side of the vehicle, centrally located in the vehicle, or any suitable combination of locations. In some embodiments, each vehicle sensor 114 may be coupled with OBD apparatus 112. For example, vehicle sensor 114 may pull energy from vehicle's 102 battery for operation.

Each vehicle sensor 114 is configured to communicate with one or more facility sensors 110. Each facility sensor 110 may be positioned in a pre-defined location within a facility. For example, each facility sensor 110 may be positioned in a respective parking spot when the facility is a parking garage, a car dealership, a rental car agency, and the like. In another example, each facility sensor 110 may be positioned at each entrance into the facility when the facility is a restaurant, coffee shop, dry cleaner, and the like.

Vehicle sensor 114 may be configured to communicate with facility sensor 110 via one or more wireless communication protocols. Such protocols may include, for example, near-field communication (NFC), Bluetooth®, active radio frequency identification (RFID), passive RFID, and WiFi™. In some embodiments, vehicle sensor 114 may be configured to continually, or intermittently, emit signals to be received by nearby sensors 110. In some embodiments, vehicle sensor 114 may be configured to continually, or intermittently, receive signals to be emitted by nearby sensors 114. For purposes of this discussion, facility sensor 110 may be configured to continually emit signals to be received by vehicle sensor 114. As such, in operation, vehicle sensor 114 may be able to detect a location of a given vehicle 102 based on the received signal emitted by facility sensor 110.

In some embodiments, vehicle sensor 114 may include a shield at least partially surrounding vehicle sensor 114. For example, in those embodiments in which the facility is a car dealership and each vehicle sensor 114 is positioned in a given parking space, the shield may be configured to at least partially block (or weaken) signals emitted from nearby vehicles 102 that are not located within the dedicated parking space of the vehicle sensor 114. In other words, the shield may be positioned about vehicle sensor 114 such that vehicle sensor 114 may only receive signals from vehicles 102 positioned thereover.

Facility sensor 110 may be configured to communicate with organization computing system 104 via network 105. Organization computing system 104 may include at least a web server 116 and an account handler 118. Web server 116 may include a computer system configured to generate and provide one or more functionalities to customers or users. For example, web server 112 may facilitate communication between facility sensor 110 and organization computing system 104, such that facility sensor 110 can log (or report) vehicle location to organization computing system 104.

Account handler 118 may be configured to manage information associated with each vehicle 102. Account handler 118 may communicate with database 108. Database 108 may include vehicle information 120 and user profiles(s) 126. Vehicle information 120 may include one or more sensor IDs 122 and one or more location IDs 124. One or more sensor IDs 122 may correspond to a unique ID provided to each vehicle sensor 114 positioned in the respective vehicle. One or more location IDs 124 may correspond to an ID associated with each facility sensor 110 that registered a signal hit from the vehicle sensor 114 corresponding to the vehicle 102. As such, account handler 118 may manage a location history of each vehicle 102 based on those sensors 114 that reported a signal hit to organization computing system 104. Each user profile 126 may correspond to a given vehicle 102. User profile 126 is configured to store one or more preferences of the user based on a user history at one or more facilities. For example, user profile 126 may include an order history list 128. Order history list 128 may maintain, for example, a record of the user's orders at the one or more facilities. Organization computing system 104 may analyze order history list 128 to predict an order to be made by the user at a given facility.

In some embodiments, database 108 may further include user profile information 126 stored therein. User profile information 126 may include information associated with a driver of vehicle 102. For example, user profile information 126 may include name, age, date of birth, address, phone number, and the like. In some embodiments, user profile information 126 may include one or more driver preferences. Such driver preferences may be tailored to the facility in which facility sensors 110 are placed. For example, in those embodiments in which the facility is a fast food restaurant, the one or more driver preferences may include frequently ordered meals. As such, when the driver's vehicle arrives at the fast food restaurant, the registering of vehicle sensor 114 in the driver's vehicle may signal to the fast food restaurant to begin preparing an order specified in the user profile information 126.

In some embodiments, computing environment 100 may further include one or more hubs 106. Each hub 106 may function as a relay between each facility sensor 110 and organization computing system 104. For example, rather than communicate directly with organization computing system 104, facility sensor 110 may communicate with a hub 106. In turn, hub 106 may communicate the information provided by facility sensor 110 to organization computing system 104. In some embodiments, facility sensor 110 may communicate with hub 106 via a first communication protocol, and hub 106 may communicate with organization computing system via a second communication protocol. For example, facility sensor 110 may communicate with hub 106 via a lower power communication protocol (e.g., Bluetooth Low Energy (BLE), NFC, ZigBee, etc.); hub 106 may communicate with organization computing system 104 via a higher power communication protocol that is able to efficiently transfer larger packets of information (e.g., WiFi).

Figure 2:
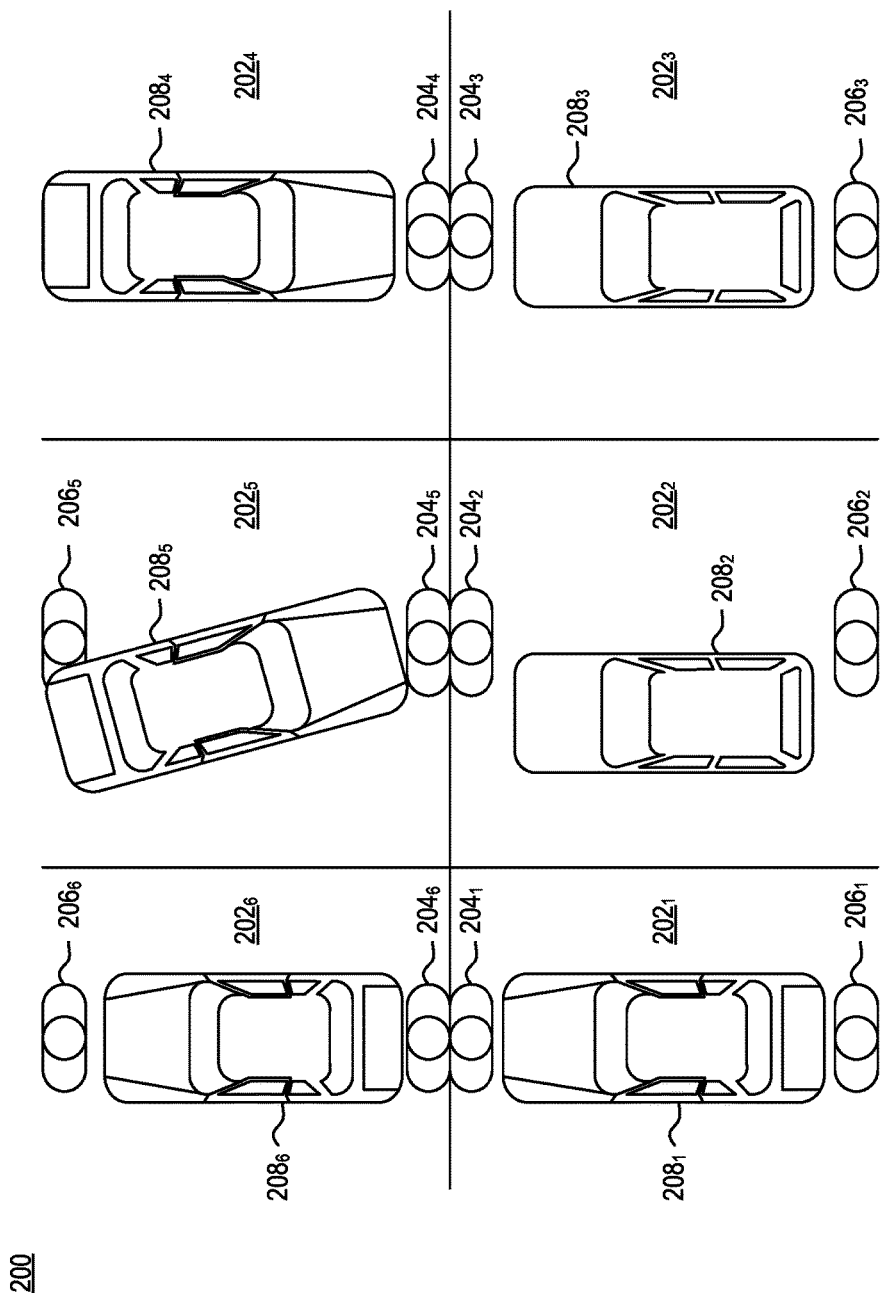
FIG. 2 is a block diagram of an exemplary facility, according to one exemplary embodiment.

FIG. 2 is a block diagram of an exemplary facility 200, according to one exemplary embodiment. Facility 200 may include one or more parking spaces $202_1$-$202_6$ (generally "parking space 202"). Each parking space 202 may include one or more first sensors $204_1$-$204_6$ (generally "first sensor 204"). For example, parking space $202_1$ includes first sensor $204_1$; parking space $202_2$ includes first sensor $204_2$; parking space $202_3$ includes first sensor $204_3$; parking space $202_4$ includes first sensor $204_4$; parking space $202_5$ includes first sensor $204_5$; and parking space $202_6$ includes first sensor $204_6$. Generally, each first sensor 204 may be positioned at a first location across all parking spaces 202.

Each parking space 202 may further include one or more second sensors $206_1$-$206_6$ (generally "second sensor 206"). For example, parking space $202_1$ includes second sensor $206_1$; parking space $202_2$ includes second sensor $206_2$; parking space $202_3$ includes second sensor $206_3$; parking space $202_4$ includes second sensor $206_4$ (obscured); parking space $202_5$ includes second sensor $206_5$; and parking space $202_6$ includes second sensor $206_6$. Generally, each second sensor 206 may be positioned at a second location in each parking space 202.

Facility 200 may further include one or more vehicles $208_1$-$208_6$ (generally "vehicle 208"). For example, as illustrated, vehicle $208_1$ is positioned in parking space $202_1$; vehicle 2082 is positioned in parking space $202_2$; vehicle $208_3$ is positioned in parking space $202_3$; vehicle $208_4$ is positioned in parking space $202_4$; vehicle $208_5$ is positioned in parking space $202_5$; and vehicle $208_6$ is positioned in parking space $202_6$. Each vehicle 208 may include a vehicle sensor 114 positioned therein. Each vehicle sensor 114 may be configured to communicate with one or more first sensors 204. In some embodiments, each vehicle sensor 114 may be configured to communicate with one or more second sensors 206.

In operation, each vehicle sensor 114 positioned in each vehicle 208 may be configured to continually emit signals. As such, as a driver of vehicle 208 parks positions vehicle 208 in a parking space 202, a first sensor 204 (and/or second sensor 206) may be configured to receive a signal emitted from the vehicle sensor 114 positioned in vehicle 208. For example, upon sensor 204 (and/or second sensor 206) receiving an emitted signal from vehicle sensor 114 positioned in vehicle 208, first sensor 204 may demodulate the emitted signal to identify a vehicle identifier contained therein. The vehicle identifier may be subsequently used by organization computing system 104 when determining the specific vehicle that was registered. Once first sensor 204 (and/or second sensor 206) identifies the vehicle identifier contain in the received signal, first sensor 204 may notify organization computing system 104.

As illustrated, in some embodiments a facility sensor 110 (e.g., first sensor 204 and/or second sensor 206) may detect two or more vehicle sensors 114. For example, due to multiple vehicles 102 (e.g., vehicle $208_6$, $208_5$, $208_4$) co-located with first sensor $204_5$ and second senor $206_5$, one or more of first sensor $204_5$ and second sensor $206_5$ may detect signals emitted from each vehicle sensor 114 positioned in vehicle $208_6$, $208_5$, and $208_4$. As such, in order to correctly identify the particular vehicle located in sensors' $204_5$, $206_5$ dedicated parking space $202_5$, first sensor $204_5$ (and/or second sensor $206_5$) may determine the strength of each emitted signal. First sensor $204_5$ (and/or second sensor $206_5$) may report to organization computing system 104 the received identification code in the emitted signal that registered the strongest. Stated more generally, in situations during which a facility sensor 110 (e.g., first sensor 204 and/or second sensor 206) receives signals from two or more vehicle sensors 114, facility sensor 110 may determine which signal is strongest as a means of filtering nearby vehicle sensors 114 that are not located in facility sensor's 110 given location.

Figure 3:
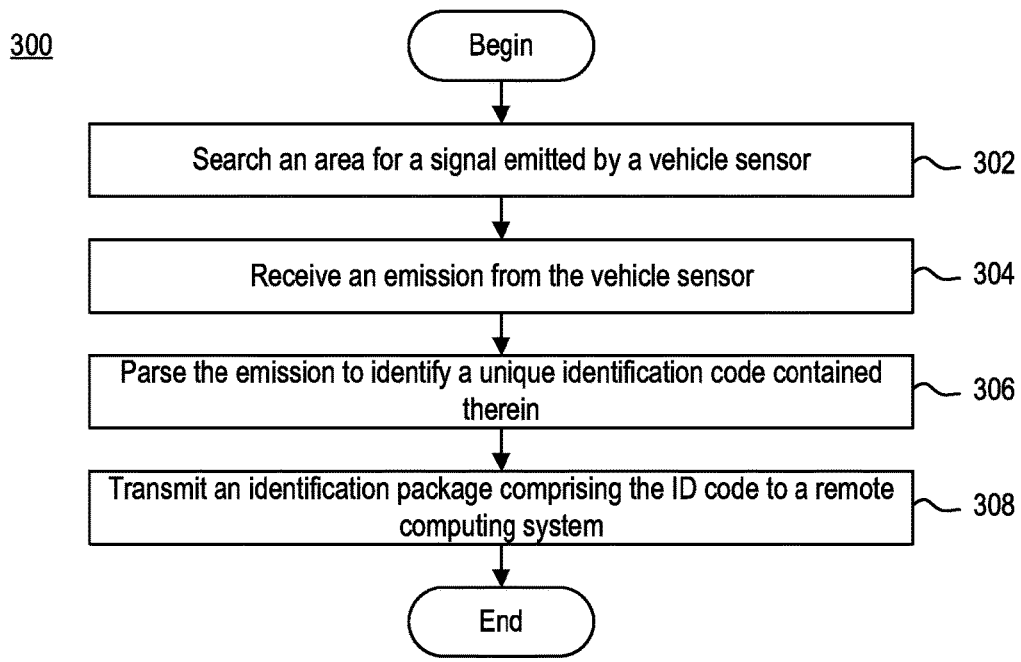
FIG. 3 is a flow diagram of a method of locating a vehicle within a facility, according to one exemplary embodiment.

FIG. 3 is a flow diagram illustrating a method 300 of locating a vehicle, according to one embodiment. Method 300 begins at step 302. At step 302, facility sensor 110 may scan an area for a signal emitted by a vehicle sensor 114. In some embodiments, facility sensor 110 may be positioned at an entrance (or exit) of a facility to determine whether a vehicle is entering (or exiting) the facility. In some embodiments, facility sensor 110 may be embodied in one or more of first sensor 204 and second sensor 206. For example, facility sensor 110 may be positioned in a parking space at the facility.

At step 304, facility sensor 110 may receive a signal emitted from vehicle sensor 114. In some embodiments, facility sensor 110 may receive one or more signals from vehicle sensor 114 as vehicle 208 enter (or exit) the facility. In some embodiments, facility sensor 110 may receive one or more signals from vehicle sensor 114 as vehicle is positioned in a parking space 202.

At step 306, facility sensor 110 may parse the received signal to identify a unique identification code contained therein. For example, facility sensor 110 may demodulate the received signal to identify the unique identification code included in a modulated signal. In some embodiments, the unique identification code may include a vehicle identification number (VIN). In some embodiments, the unique identification code may include one or more characteristics of the vehicle, such as, but not limited to, year of manufacture, make of the vehicle, model of the vehicle, exterior color, interior color, number of cylinders, and the like.

At step 308, facility sensor 110 may transmit an identification package to organization computing system 104. Identification package may include at least the identification code. In some embodiments, identification package may further include a time the emitted signal was received by facility sensor 110. In some embodiments, identification package may further include an identifier corresponding to facility sensor 110. For example, the identifier may correspond to a unique identification code for facility sensor 110.

Figure 4:
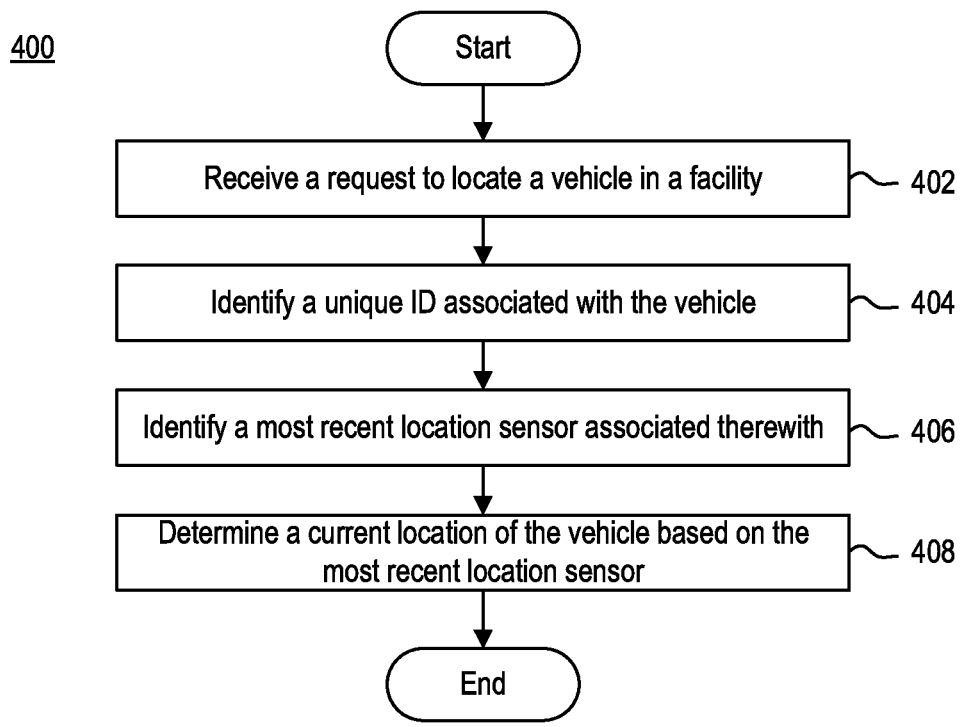
FIG. 4 is a flow diagram of a method of locating a vehicle within a facility, according to one exemplary embodiment.

FIG. 4 is a flow diagram illustrating a method 400 of location a vehicle, according to one embodiment. Method 400 may begin at step 402. At step 402, organization computing system 104 may receive a request to locate a vehicle within a facility. For example, a customer may enter a rental car facility seeking a specific type of vehicle. The request for the vehicle may correspond to the request received by organization computing system 104. In another example, a customer may enter a parking facility seeking retrieval of the customer's vehicle.

At step 404, organization computing system 104 may identify a unique identification code associated with the vehicle. For example, the unique identification code may be the VIN associated with the vehicle. In another example, the unique identification code may a code associated with vehicle sensor 114 positioned in the vehicle.

At step 406, organization computing system 104 may identify a most recent location associated with the requested vehicle. Handler 118 may query database 108 with the unique identification code (e.g., sensor ID 122). Handler 118 may identify a most recent location of the vehicle by identifying the most recent location ID 124. In some embodiments, handler 118 may return more than the most recent location of the vehicle. For example, handler 118 may be configured to return the previous three to five locations of the vehicle.

At step 408, organization computing system 104 may determine a current location of the vehicle. For example, organization computing system 104 may pin facility sensor 110 corresponding to the most recent ID 124. Pinging facility sensor 110 may prompt facility sensor 110 to submit a vehicle sensor 114 reading. For example, because vehicle sensor 114 may continually emit modulated signals to be received by facility sensor 110, facility sensor 110 may transmit a vehicle update to organization computing system 104 when prompted.

Figure 5:
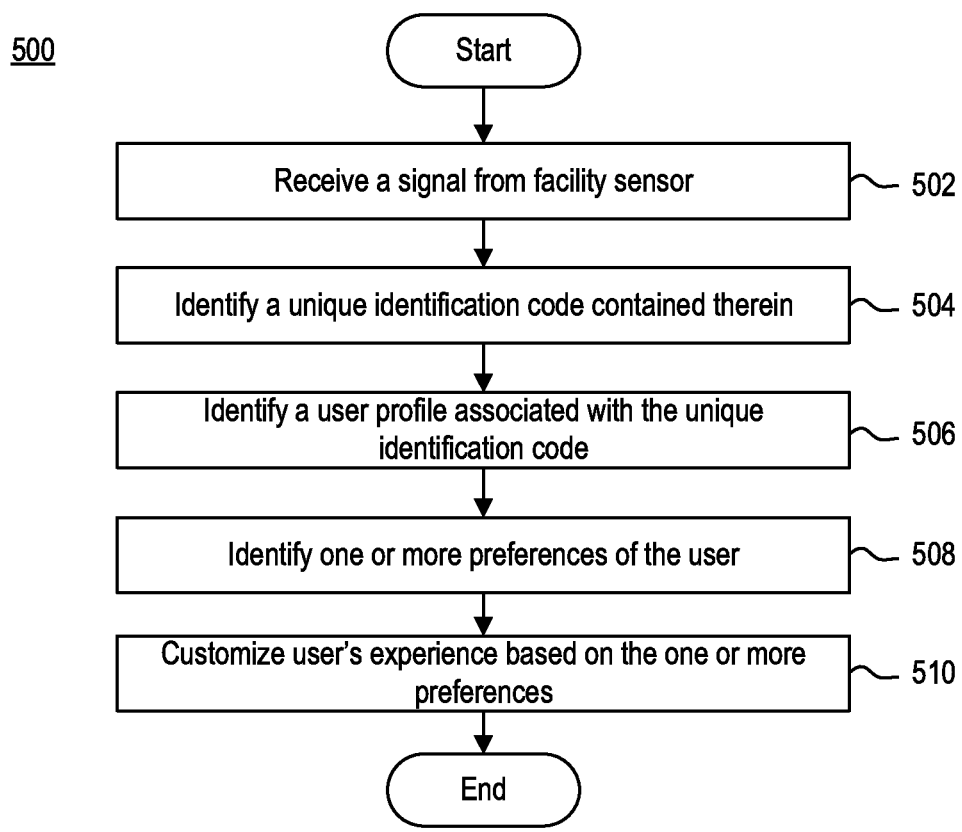
FIG. 5 is a flow diagram illustrating a method of customizing a user experience, according to one exemplary embodiment.

FIG. 5 is a flow diagram illustrating an exemplary method 500 of customizing a user experience, according to one embodiment. Method 500 may begin at step 502. At step 502, organization computing system 104 may receive a signal from a facility sensor 110. The signal may include an indication of a user's arrival at a facility. For example, the indication is trigged by facility sensor 110 receiving an emitted signal from a vehicle sensor 114 positioned in a vehicle of the user. For example, facility sensor 110 may be positioned at an entrance of a facility and, as vehicle 102 enters the facility, vehicle sensor 114 positioned therein may continually emit signals, at least one of which is received by facility sensor 110.

At step 504, organization computing system 104 may parse the signal to identify a unique identification code contained therein. For example, the unique identification code may be the VIN associated with the vehicle. In another example, the unique identification code may be a code associated with vehicle sensor 114 positioned in the vehicle.

At step 506, organization computing system 104 may query database 108 to identify a user profile associated with the unique identification code. For example, organization computing system 104 may associate the unique identification code (e.g., sensor ID 122) with a user profile (e.g., user profile 126).

At step 508, organization computing system 104 may identify, in the user profile 126, one or more preferences of the user based on a user history at the facility. For example, user profile 126 may include an order history list 128. Order history list 128 may maintain a record of the user's orders at the facility. Organization computing system 104 may analyze order history list 128 to predict an order to be made by the user at the facility.

At step 510, organization computing system 104 may customize the user's experience based on the one or more preferences. For example, based on determining that the user is likely to order a specific menu item, facility may begin preparing that menu item, such that the menu item can be delivered to user more quickly.

In some embodiments, such system may be used at a dealership. For example, such system may be adapted when a customer arrives with a ready service appointment, or even an unscheduled one. In another example, such system may be adapted once the appointment is completed and the vehicle has been parked, the dealership will now have ready knowledge of where that is located for the customer.

Figure 6:
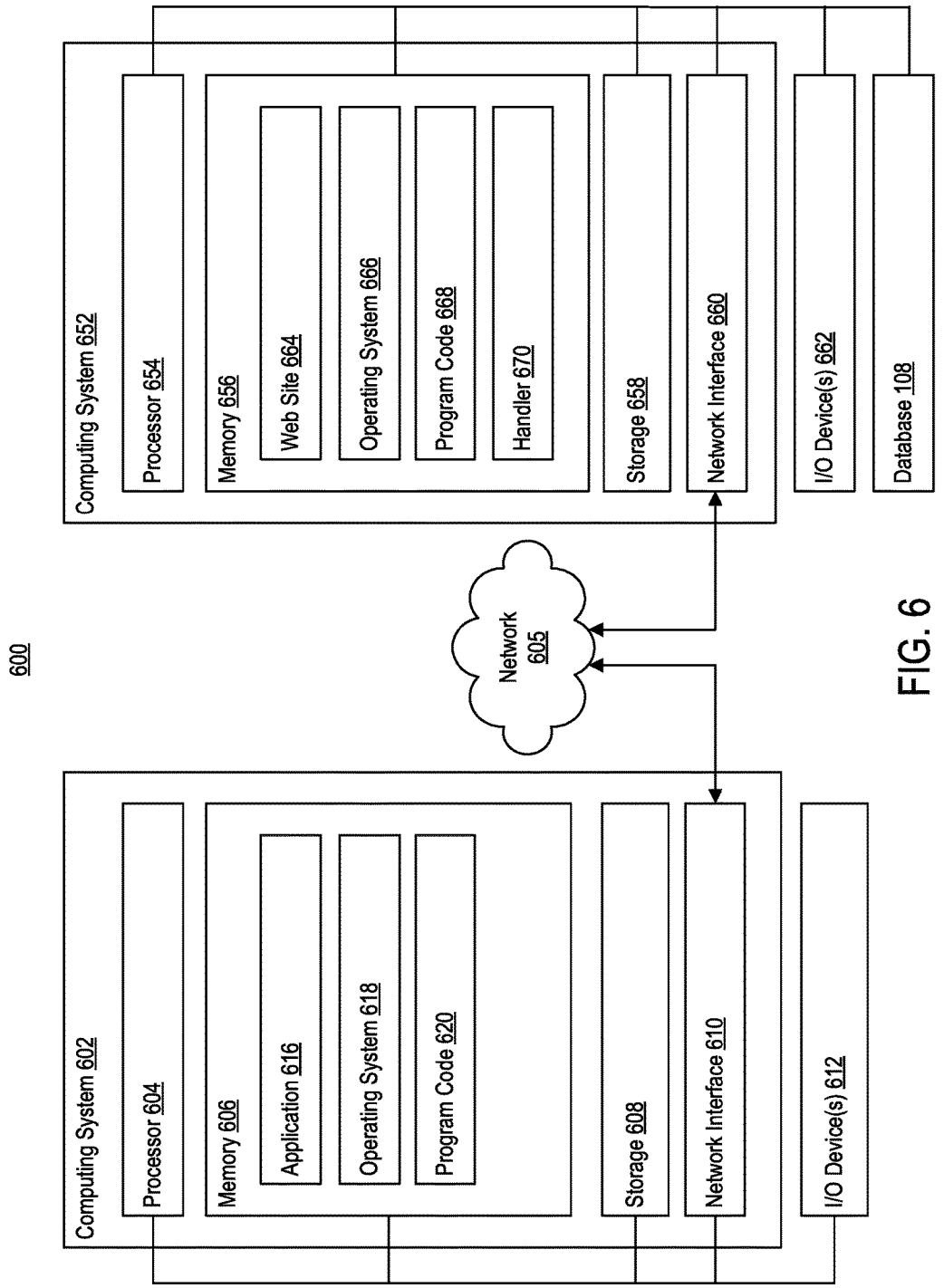
FIG. 6 is a block diagram illustrating a computing environment, according to one exemplary embodiment.

FIG. 6 is a block diagram illustrating an exemplary computing environment 600, according to some embodiments. Computing environment 500 includes computing system 602 and computing system 652. Computing system 602 may be representative of facility sensor 110. Computing system 652 may be representative of organization computing system 104.

Computing system 602 may include a processor 604, a memory 606, a storage 608, and a network interface 610. In some embodiments, computing system 602 may be coupled to one or more I/O device(s) 612 (e.g., keyboard, mouse, etc.).

Processor 604 may retrieve and execute program code 620 (i.e., programming instructions) stored in memory 606, as well as stores and retrieves application data. Processor 604 may be included to be representative of a single processor, multiple processors, a single processor having multiple processing cores, and the like. Network interface 610 may be any type of network communications allowing computing system 602 to communicate externally via computing network 605. For example, network interface 610 is configured to enable external communication with computing system 652.

Storage 608 may be, for example, a disk storage device. Although shown as a single unit, storage 608 may be a combination of fixed and/or removable storage devices, such as fixed disk drives, removable memory cards, optical storage, network attached storage (NAS), storage area network (SAN), and the like.

Memory 606 may include application 616, operating system 618, and program code 620. Program code 620 may be accessed by processor 604 for processing (i.e., executing program instructions). Program code 620 may include, for example, executable instructions for communicating with computing system 652 to provide user with one or more functionalities associated with a user's account with a financial organization. Program code 620 may also include, for example, executable instructions for allowing a user to request specific denominations in a withdrawal event.

Computing system 652 may include a processor 654, a memory 656, a storage 658, and a network interface 660. In some embodiments, computing system 652 may be coupled to one or more I/O device(s) 662. In some embodiments, computing system 652 may be in communication with database 108.

Processor 654 may retrieve and execute program code 668 (i.e., programming instructions) stored in memory 656, as well as stores and retrieves application data. Processor 654 is included to be representative of a single processor, multiple processors, a single processor having multiple processing cores, and the like. Network interface 660 may be any type of network communications enabling computing system 652 to communicate externally via computing network 605. For example, network interface 660 allows computing system 652 to communicate with computer system 602.

Storage 658 may be, for example, a disk storage device. Although shown as a single unit, storage 658 may be a combination of fixed and/or removable storage devices, such as fixed disk drives, removable memory cards, optical storage, network attached storage (NAS), storage area network (SAN), and the like.

Memory 656 may include website 664, operating system 666, program code 668, and account handler 670. Program code 668 may be accessed by processor 654 for processing (i.e., executing program instructions). Program code 668 may include, for example, executable instructions configured to perform steps discussed above in conjunction with FIGS. 3 and 4. As an example, processor 654 may access program code 668 to perform operations for locating a vehicle within a facility. Website 664 may be accessed by computing system 602. For example, website 664 may include content accessed by computing system 602 via a web browser or application.

Account handler 670 may be configured to manage one or more vehicle accounts 116 stored in database 108. For example account handler 670 may be used to maintain registered locations of each vehicle and unique identification code associated therewith.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of locating a vehicle, comprising:
   receiving a request, from a user, to locate a vehicle within a facility associated with an organization;
   parsing the request to identify one or more characteristics of the vehicle;
   identify a sensor corresponding to the vehicle based on the one or more characteristics of the vehicle;
   identifying a most recent location of the vehicle based on the last registered position of the vehicle within the facility;
   transmitting a signal to a parking spot sensor at the most recent location of the vehicle in the facility, wherein the signal is an instruction to the parking spot sensor to report back a unique identification of a vehicle sensor co-located therewith;
   receiving, from the parking spot sensor, the unique identification of the vehicle sensor co-located therewith;
   determining that the unique identification of the vehicle sensor co-located with the parking spot sensor matches the sensor of the requested vehicle; and
   reporting to the user a current location of the vehicle within the facility based on a location of the parking spot sensor.

2. The method of claim 1, wherein the one or more characteristics of the vehicle comprises a license plate number, a vehicle make, a vehicle model, a vehicle color, and a vehicle mileage.

3. The method of claim 1, wherein receiving, from the parking spot sensor, the unique identification of the vehicle sensor co-located therewith comprises:
   receiving, from the parking spot sensor, a return signal; and
   identifying a strength of the return signal to confirm the vehicle from which it originated.

4. The method of claim 1, wherein the sensor comprises: a shield configured to at least partially block signals emitted from adjacent vehicles.

5. The method of claim 4, wherein receiving, from the parking spot sensor, the unique identification of the vehicle sensor co-located therewith comprises:
   receiving the unique identification from a hub co-located with the vehicle sensor, the hub configured as a relay between the vehicle sensor and the organization.

6. The method of claim 1, wherein identifying a most recent location of the vehicle based on the last registered position of the vehicle within the facility, comprises:
   identifying a location history of the vehicle; and
   identifying a parking spot sensor at the most recent location of the vehicle in the facility.

7. The method of claim 1, wherein the instruction to the parking spot sensor to report back the unique identification of a vehicle sensor co-located therewith, comprises:
   an instruction to ping the vehicle sensor co-located therewith.

8. A system, comprising:
   one or more sensors, each sensor positioned within a bounded a location within a facility; and
   a computing system in communication with the one or more sensors, the computing system, comprising:
   a processor; and
   a memory having programming instructions stored thereon, which, when executed by the processor, performs an operation of locating a vehicle, comprising:
   receiving a request, from a user, to locate a vehicle within a facility associated with an organization;
   parsing the request to identify one or more characteristics of the vehicle;
   identifying a vehicle sensor corresponding to the vehicle based on the one or more characteristics of the vehicle;
   identifying a most recent location of the vehicle based on the last registered position of the vehicle within the facility;
   transmitting a signal to a sensor of the one or more sensors positioned at the most recent location of the vehicle in the facility, wherein the signal is an instruction to the sensor to report back a unique identification of a vehicle sensor co-located therewith;
   receiving, from the parking spot sensor, the unique identification of the vehicle sensor co-located therewith;
   determining that the unique identification of the vehicle sensor co-located with the sensor matches the vehicle sensor of the requested vehicle; and
   reporting to the user a current location of the vehicle within the facility based on a location of the sensor.

9. The system of claim 8, wherein the one or more characteristics of the vehicle comprises a license plate number, a vehicle make, a vehicle model, a vehicle color, and a vehicle mileage.

10. The system of claim 8, wherein receiving, from the parking spot sensor, the unique identification of the vehicle sensor co-located therewith comprises:
    receiving, from the parking spot sensor, a return signal; and
    identifying a strength of the return signal to confirm the vehicle from which it originated.

11. The system of claim 8, wherein the sensor comprises:
    a shield configured to at least partially block signals emitted from adjacent vehicles.

12. The system of claim 8, wherein receiving, from the parking spot sensor, the unique identification of the vehicle sensor co-located therewith comprises:
    receiving the unique identification from a hub co-located with the vehicle sensor, the hub configured as a relay between the vehicle sensor and the organization.

13. The system of claim 8, wherein identifying a most recent location of the vehicle based on the last registered position of the vehicle within the facility, comprises:
  identifying a location history of the vehicle; and
  identifying a sensor at the most recent location of the vehicle in the facility.

14. The system of claim 8, wherein the instruction to the sensor to report back the unique identification of the vehicle sensor co-located therewith, comprises:
  an instruction to ping the vehicle sensor co-located therewith.

15. A non-transitory computer readable medium including one or more sequences of instructions that, when executed by the one or more processors, causes:
  receiving a request, from a user, to locate a vehicle within a facility associated with an organization;
  parsing the request to identify one or more characteristics of the vehicle;
  identify a sensor corresponding to the vehicle based on the one or more characteristics of the vehicle;
  identifying a most recent location of the vehicle based on the last registered position of the vehicle within the facility;
  transmitting a signal to a parking spot sensor at the most recent location of the vehicle in the facility, wherein the signal is an instruction to the parking spot sensor to report back a unique identification of a vehicle sensor co-located therewith;
  receiving, from the parking spot sensor, the unique identification of the vehicle sensor co-located therewith;
  determining that the unique identification of the vehicle sensor co-located with the parking spot sensor matches the sensor of the requested vehicle; and
  reporting to the user a current location of the vehicle within the facility based on a location of the parking spot sensor.

16. The non-transitory computer readable medium of claim 15, wherein the one or more characteristics of the vehicle comprises a license plate number, a vehicle make, a vehicle model, a vehicle color, and a vehicle mileage.

17. The non-transitory computer readable medium of claim 15, wherein receiving, from the parking spot sensor, the unique identification of the vehicle sensor co-located therewith comprises:
  receiving, from the parking spot sensor, a return signal; and
  identifying a strength of the return signal to confirm the vehicle from which it originated.

18. The non-transitory computer readable medium of claim 15, wherein the sensor comprises:
  a shield configured to at least partially block signals emitted from adjacent vehicles.

19. The non-transitory computer readable medium of claim 18, wherein receiving, from the parking spot sensor, the unique identification of the vehicle sensor co-located therewith comprises:
  receiving the unique identification from a hub co-located with the vehicle sensor, the hub configured as a relay between the vehicle sensor and the organization.

20. The non-transitory computer readable medium of claim 15, wherein identifying a most recent location of the vehicle based on the last registered position of the vehicle within the facility, comprises:
  identifying a location history of the vehicle; and
  identifying a parking spot sensor at the most recent location of the vehicle in the facility.

\* \* \* \* \*